United States Patent
Whitfield et al.

(10) Patent No.: US 12,330,365 B2
(45) Date of Patent: Jun. 17, 2025

(54) APPARATUS AND METHOD FOR 3D PRINTING WITH SMOOTH SURFACE

(71) Applicant: Magna Exteriors Inc., Concord (CA)

(72) Inventors: Thomas M. Whitfield, Toronto (CA); John A. Ingram, Richmond Hill (CA); Zongxun Wang, Toronto (CA); Alexis Baltazar-y-Jimenez, Concord (CA)

(73) Assignee: Magna Exteriors Inc., Aurora (CA)

( * ) Notice: Subject to any disclaimer, the term of this patent is extended or adjusted under 35 U.S.C. 154(b) by 596 days.

(21) Appl. No.: 17/273,830

(22) PCT Filed: Sep. 9, 2019

(86) PCT No.: PCT/IB2019/057589
§ 371 (c)(1),
(2) Date: Mar. 5, 2021

(87) PCT Pub. No.: WO2020/049544
PCT Pub. Date: Mar. 12, 2020

(65) Prior Publication Data
US 2021/0316499 A1    Oct. 14, 2021

Related U.S. Application Data

(60) Provisional application No. 62/728,370, filed on Sep. 7, 2018.

(51) Int. Cl.
*B29C 64/106*    (2017.01)
*B29C 64/209*    (2017.01)
(Continued)

(52) U.S. Cl.
CPC .......... *B29C 64/106* (2017.08); *B29C 64/209* (2017.08); *B29C 64/245* (2017.08);
(Continued)

(58) Field of Classification Search
CPC ... B29C 64/106; B29C 64/112; B29C 64/118; B29C 64/209; B29C 64/245; B33Y 10/00; B33Y 30/00; B33Y 70/00
See application file for complete search history.

(56) References Cited

U.S. PATENT DOCUMENTS

2016/0075290 A1*   3/2016  Catlin ............... B05D 7/14
                                             427/407.1
2017/0317259 A1*  11/2017  Hatch ............... B29C 64/393
(Continued)

FOREIGN PATENT DOCUMENTS

CN   103496165 A    1/2014
CN   106042404 A   10/2016
(Continued)

OTHER PUBLICATIONS

European Search Report for Application No. EP19858036 dated Sep. 3, 2021.
(Continued)

*Primary Examiner* — Jamel M Nelson
(74) *Attorney, Agent, or Firm* — Warn Partners, P.C.

(57) ABSTRACT

An apparatus and process for forming a predetermined three-dimensional (3D) object, in particular to an apparatus and method for making of a predetermined 3D object including an outer finished show surface without the use of post processing steps, and selectively printing three-dimension features onto another surface without compromising the integrity of the outer finished surface quality. A build platform of the apparatus includes a smooth surface to disperse deposited materials into a highly uniform base layer with exceptional surface quality on the interface between the deposited material and the build platform. The apparatus and process have the ability to produce an exceptionally smooth
(Continued)

surface capable of achieving automotive standards for exterior components without the use of post-processing.

8 Claims, 2 Drawing Sheets

(51) Int. Cl.
*B29C 64/245* (2017.01)
*B33Y 10/00* (2015.01)
*B33Y 30/00* (2015.01)
*B33Y 70/00* (2020.01)
B29K 55/02 (2006.01)
B29K 69/00 (2006.01)
B29K 77/00 (2006.01)
B29K 307/04 (2006.01)
B29K 309/08 (2006.01)

(52) U.S. Cl.
CPC .............. *B33Y 10/00* (2014.12); *B33Y 30/00* (2014.12); *B33Y 70/00* (2014.12); *B29K 2055/02* (2013.01); *B29K 2069/00* (2013.01); *B29K 2077/00* (2013.01); *B29K 2307/04* (2013.01); *B29K 2309/08* (2013.01); *B29K 2995/0013* (2013.01)

(56) References Cited

U.S. PATENT DOCUMENTS

| 2018/0093326 | A1* | 4/2018 | Ishida | C04B 35/111 |
| 2018/0250889 | A1* | 9/2018 | Czinger | B22F 10/18 |
| 2019/0105852 | A1* | 4/2019 | Hoyle | B29C 70/06 |
| 2019/0270297 | A1* | 9/2019 | Susnjara | B29C 48/18 |
| 2021/0328130 | A1* | 10/2021 | Wang | B29C 70/62 |

FOREIGN PATENT DOCUMENTS

| WO | WO-2015149054 A1 * | 10/2015 | ............. B05D 3/007 |
| WO | 2018/005472 A1 | 1/2018 | |
| WO | 2018015192 A1 | 1/2018 | |

OTHER PUBLICATIONS

International Search Report for PCT/IB2019/057589 dated Dec. 4, 2019.

\* cited by examiner

APPARATUS AND METHOD FOR 3D PRINTING WITH SMOOTH SURFACE

CROSS-REFERENCE TO RELATED APPLICATIONS

This application is a National Stage of PCT International Application No. PCT/IB2019/057589, filed Sep. 9, 2019, which claims the benefit of U.S. Provisional Patent Application No. 62/728,370, filed Sep. 7, 2018. The disclosures of the above applications are incorporated herein by reference.

FIELD OF THE INVENTION

The present invention relates to an apparatus and process of selectively making three-dimensional objects and three-dimensional features onto said objects.

BACKGROUND OF THE INVENTION

Currently available apparatus and methodologies, such as the one described in U.S. Pat. No. 5,121,329A to Crump, are not capable of producing an exceptionally smooth surface without the use of post-processing techniques such as wet sanding. Post-processing greatly reduces the efficiency of the method when producing components intended for visual surfaces and are required to meet strict surface requirements. When it is necessary to have additional features on the reverse side (inner) of an exceptionally smooth surface (outer) traditional manufacturing techniques can compromise the integrity of the outer surface quality through distortion (also called read through). Thus engineering controls, such as increasing the nominal thickness of the component in the area of the additional feature, must be implemented to counteract the distortion which can add cost, increase cycle time, and incur geometric issues such as warpage.

The substrate 108 of U.S. Pat. No. 5,121,329A—Crump is rough or abrasive. A sandpaper-receiving surface 108 is highlighted throughout U.S. Pat. No. 5,121,329A—Crump. A wire mesh sandpaper 108 is found particularly satisfactory. The substrate may be a fine wire-mesh screen coated with sand applied with double-faced adhesive tape. U.S. Pat. No. 5,121,329A—Crump also states that "the sand particles sand particles on the substrate 108 provide particularly effective adhesion of the dispensed material. The material also flows into and imbeds in the cells or pores of the open matrix wire screen. Separation of the article can be facilitated by using a conductive wire mesh screen substrate 108 made of copper wires to which a low voltage current is applied after the article is formed. This heats the screen slightly and frees the article. Alternatively, the wire mesh screen could be magnetized and iron particles would be mixed into the supply material to enhance adhesion of the foundation layer to the substrate 108. Interruption of a magnetic field applied to base plate 10 would permit separation of the formed article."

There is no known use of additive manufacturing for directly producing an exceptionally smooth surface capable of achieving automotive standards for exterior components without the use of post-processing.

There have been previous inventions targeting the improvement and addition of capabilities to additive manufacturing methods, such as in U.S. Pat. Application No. 20180147774A1 which modifies the build platform of the apparatus to improve the mechanical bond between the work piece and the build surface. However, while improving the stability of the workpiece this invention further degrades the quality of the produced surface in terms of visual appearance. U.S. Pat. Application No. 20140178588A1 has a support structure where the top surface is perforated with holes and extends into a porous interlayer region of a substrate. Additionally, inventions such as the previously mentioned U.S. Pat. No. 5,121,329A—Crump and U.S. Pat. Application No. 20140178588A1, together make claims for the method of holding a substrate onto the platform on which the work piece is created for the purpose of improving adhesion to the platform build, the building process, and improving removability of the work piece once created, but not achieving surface quality—as is a benefit of the current invention being disclosed.

Accordingly, there exists a need for an apparatus and process of making for creating three-dimensional objects with predetermined finished show surface designs (e.g., generally smooth surface, exceptionally smooth surface, predetermined finished show surface design/Class A surface, etc). Further, there exists a need for creating an apparatus and process of making for creating three-dimensional objects with predetermined three dimensional features incorporated on at least one side of the article (e.g., predetermined features onto the reverse side as the finished show surface, inner side, reverse side (e.g., inner surface) of a substantially smooth surface (e.g., outer surface, finished show surface, Class A surface) without compromising the integrity of the other side's quality (of the outer surface quality)

SUMMARY OF THE INVENTION

There is provided an apparatus and process for forming a predetermined three-dimensional (3D) object, in particular to an apparatus and method for making of a predetermined 3D object including an outer finished show surface without the use of post processing steps, and printing three-dimension features onto another surface without compromising the integrity of the outer finished surface quality. The apparatus and process have the ability to produce an exceptionally smooth surface capable of achieving automotive standards for exterior components without the use of post-processing.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
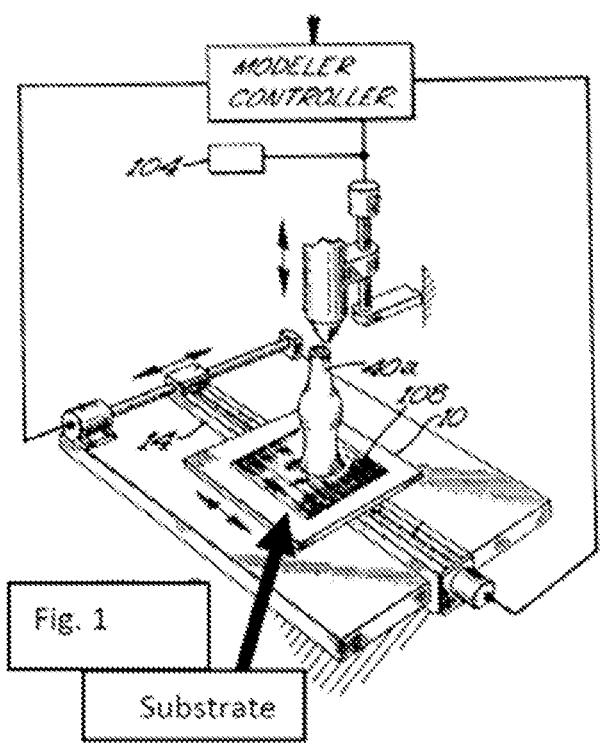
FIG. 1, is a diagrammatic view showing a conventional computer-aided design system for operating a conventional article-forming apparatus.

Referring to FIG. 1 generally, there is illustrated a conventional apparatus and methodology, such as the one described in U.S. Pat. No. 5,121,329A—Crump, that is not capable of producing an exceptionally smooth surface without the use of post-processing techniques such as wet sanding. Known systems, such as FIG. 1 from U.S. Pat. No. 5,121,329A—Crump and U.S. Pat. No. 20140178588A1, together make claims for the method of holding a substrate onto the platform on which the work piece is created for the purpose of improving adhesion to the platform build, the building process, and improving removability of the work piece once created, but not achieving surface quality—as is a benefit of the current invention being disclosed.

FIG. 1 illustrates a build platform 10, substrate 108 and work piece 40*a*. The system has several disadvantages, which will now be highlighted. The removal process of the work piece 40*a* negatively effects the quality of the bottom surface of the work piece. The substrate 108 creates imperfections in the quality of the bottom surface of work piece. Work piece 104 requires post-processing (e.g., sanding, polishing, etc) to achieve an exceptionally smooth surface. Printing additional features onto a thin section of the work piece induces warpage and distorts the bottom surface of the work piece.

Figure 2:
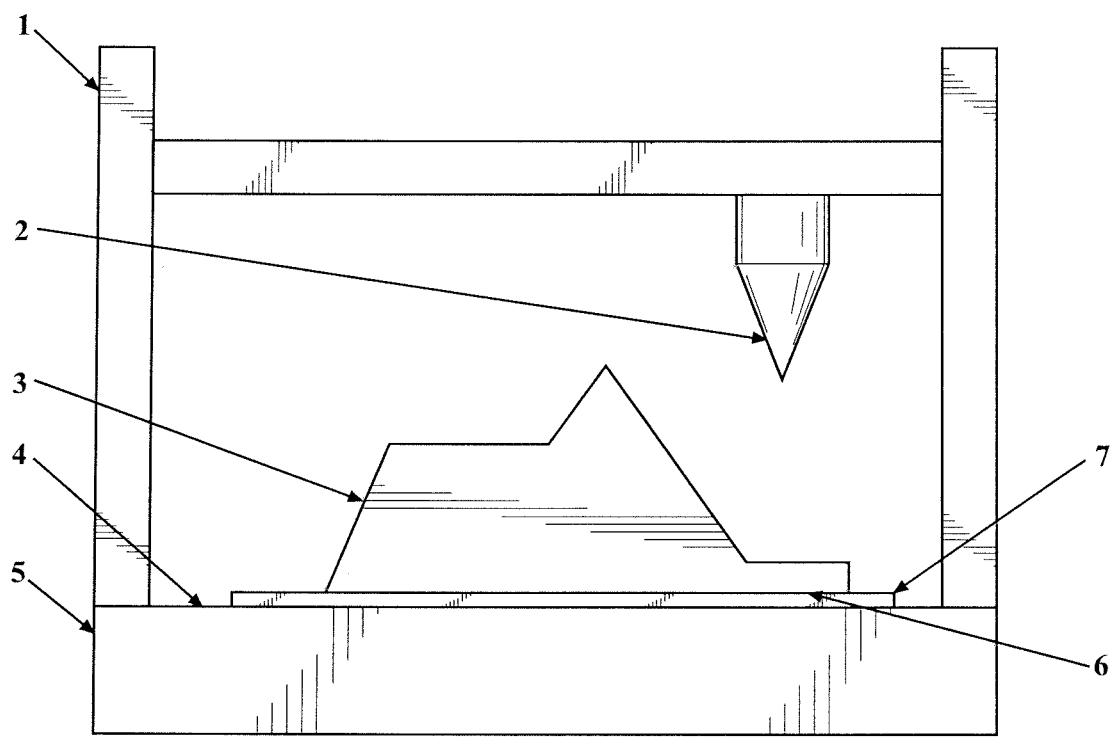
FIG. 2 is schematic of a 3D printing apparatus system incorporated with a process of making three-dimensional objects.
Figure 3:
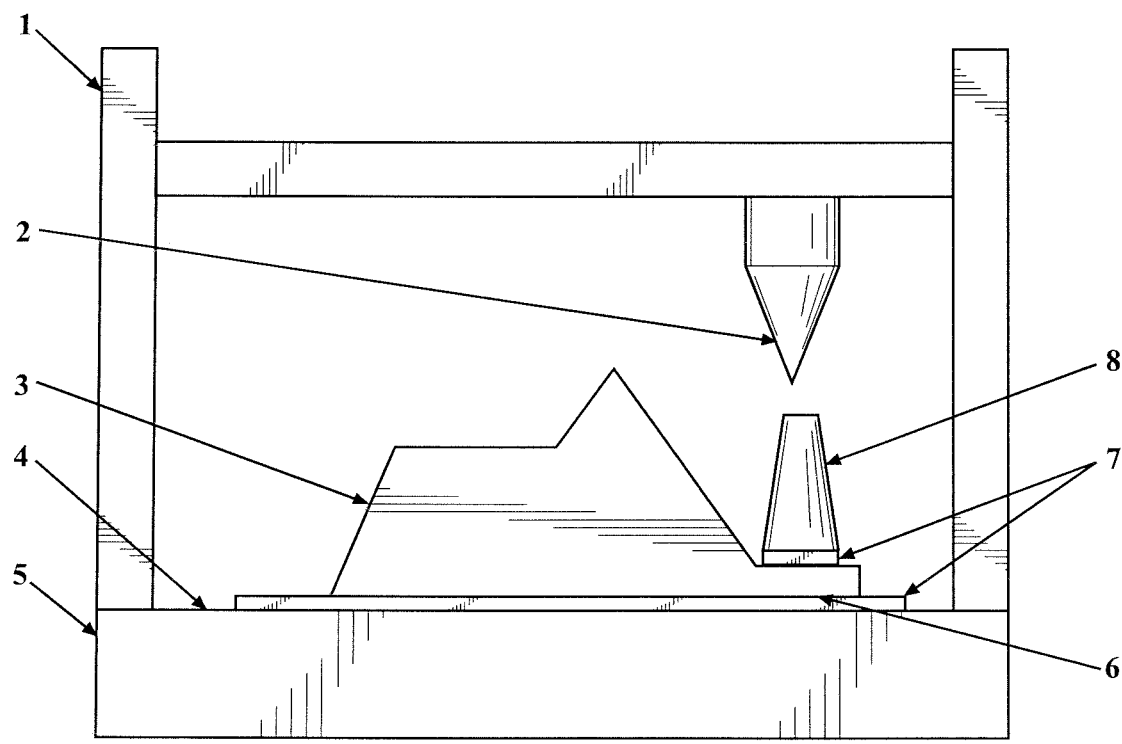
FIG. 3 is schematic of the 3D printing apparatus system incorporated with the process of making three-dimensional objects.

Referring now to FIGS. 2-3 generally, there is provided a three-dimensional printing apparatus system and method of manufacturing a three dimensional article, in accordance with the present invention. An apparatus for creating three-dimensional objects is indicated generally at 1 ("three-dimensional printing system"), including, at least one print head shown indicated generally at 2. The print head is operably movable. The print head is preferably operable to dispense at least one predetermined deposit material and/or predetermined printing material. An exemplary work piece is shown generally at 3. Preferably, at least one work piece 3 formed at once with at least one print head 2 within the system 1.

At least one predetermined surface indicated generally at 4 (most preferably, a highly polished surface) is located adjacent to the work piece 3 and is incorporated with at least one build platform, indicated generally at 5, of the three-dimensional printing system 1. Most preferably, the surface 4 is an upward facing highly polished surface of the build platform 5 facing the work piece forming print head 2. The build platform 5 is preferably made of metal or ceramic for good heat conductivity. It is understood that any other predetermined material suitable for heat conductivity can be used without departure from the scope of the present invention.

The work piece 3 includes at least one smooth surface indicated generally at 6, preferably, an exceptionally smooth surface. Most preferably, the exceptionally smooth surface indicated generally at 6 is a molded plastic piece with at least one Class-A surface which is substantially facing the build platform 5. Optionally, at least one substrate, indicated generally at 7, is provided on the build platform 5 to provide an alternate interfacial materials, such as chemical agents, decorative or functional films, and/or functional molecules, placed down onto the build platform in the area of material deposition to achieve an exceptional surface quality on the interface between the deposited material and the build platform.

Unlike conventional systems and methods, the present invention efficiently creates three-dimensional objects requiring an exceptionally smooth surface capable of achieving automotive standards for visual compliance of an outer body component without the use post-processing techniques.

The build platform 5 is highly polished (or through any other suitable machining techniques) to disperse deposited material into a highly uniform base layer with exceptional surface quality on the interface between the deposited material and the build platform. The build platform 5 is made with, but not limited to, ceramic and metal for good heat conductivity and the build platform has the capability of being heated. In addition, the build platform 5 includes, but is not limited to, a nested profile to be able to fit the substrate with a curved outline.

The substrate preferably uses alternate interfacial materials, such as chemical agents, decorative or functional films, and/or functional molecules, etc., placed down onto the build platform 5 in the area of material deposition to achieve an exceptional surface quality on the interface between the deposited material and the build platform 5.

Referring more particularly to FIG. 3, deposited material, such as chemical agents, decorative or functional films, and/or functional molecules, etc, onto the reverse side (inner) of the exceptionally smooth surface (outer) 6 to allow for the creation of at least one additional feature indicated generally at 8 (see FIG. 3) onto the inner surface without compromising the integrity of the outer surface quality.

Physical modification, such as polishing to the reverse side (inner) of an exceptionally smooth surface (outer) allows for the creation of at least one additional feature 8 (see FIG. 3) onto the inner surface without compromising the integrity of the outer surface quality.

Referring to FIGS. 2-3 generally, printed materials to be used as the build materials include, but are not limited to, thermoplastics, such as Polyamide 6 (PA6), Polyamide 6.6 (PA66), Acrylonitrile Butadiene Styrene (ABS), Polycarbonate (PC), and PC/ABS alloys, as well as the use of any of the materials mentioned which have been reinforced with additive such as glass beads, glass fibers and/or carbon fibers as the material being used to generate the additional feature or the three-dimensional object with an exceptionally smooth surface.

Thus, the features of the invention include, but are not limited to the following: the use of a highly polished build platform to improve the base layer surface quality of a three-dimensional created component; the build platform is able to accommodate a build surface with a curved outline; the use of a substrate to improve the base layer surface quality of a three-dimensional created component; the use of any combination of methods described in above to improve the base layer surface quality of a three-dimensional created component; the use of a deposited material onto the reverse side of an exceptionally smooth surface to allow for the creation of additional feature onto that surface without distorting or negatively effecting the smooth surface quality; the use of physical modification techniques on the reverse side of an exceptionally smooth surface to allow for the creation of additional feature onto that surface without distorting or negatively effecting the smooth surface quality; and the use of any combination of methods described in above to improve the creation of an additional three-dimensional objection onto the reverse side of an exceptionally smooth surface without distorting or negatively effecting the smooth surface quality on the opposite surface to the build area.

The present invention provides an apparatus and method that allows for the creation of an exceptionally smooth surface on the base of the workpiece being generated during the process. By utilizing either a surface conditional modification to the build platform or the use of a substrate (or a combination of the two) the apparatus is able to directly produce a surface capable of achieving automotive standards for visual compliance of an outer body component.

While a substantially smooth surface is most preferred, it is understood that any other predetermined suitable surface is contemplated depending on the application without departure from the scope of the present invention.

The apparatus and methodology being disclosed also improves the addition of one or more features, added during the initial build or a separate operation, onto the reverse side (inner) of an exceptionally smooth surface (outer) without compromising the integrity of the outer surface quality. This is achieved through the deposition of either a modification material or substrate onto the inner surface or through a physical modification to the surface such as machining or polishing.

The present invention is adaptable for suitability with any 3D printing method and system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for printing a three-dimensional part, comprising:
   providing at least one predetermined printing material;
   providing at least one predetermined deposit material;
   providing at least one printing head operable to selectively deposit said at least one predetermined deposit material and/or said at least one predetermined printing material;
   providing at least one build platform including a predetermined highly polished surface operable to operably disperse said at least one predetermined deposit material and/or said at least one predetermined printing material into a uniform base layer with a predetermined surface on an interface between the deposited said at least one predetermined deposit material and/or said at least one predetermined printing material and the build platform;
   positioning said at least one printing head relative to said predetermined highly polished surface of said build platform;
   depositing the at least one predetermined deposit material and/or said at least one predetermined printing material to said build platform in a predetermined plurality of layers and predetermined pattern forming the uniform base layer;
   depositing additional predetermined plurality of layers of said at least one predetermined deposit material and/or said at least one predetermined printing material in a predetermined pattern forming a desired predetermined three-dimensional part including an outer finished show surface, without the use of post processing steps; and
   depositing said at least one predetermined deposit material onto a reverse side to said outer finished show surface and depositing said at least one predetermined printing material thereon operably forming at least one predetermined three-dimensional additional feature onto the reverse side that is an inner surface without compromising a predetermined integrity of the outer finished show surface quality.

2. The method for printing a three-dimensional part of claim 1, wherein said at least one predetermined printing material is/are selected from the group consisting of thermoplastics, Polyamide 6 (PA6), Polyamide 6.6 (PA66), Acrylonitrile Butadiene Styrene (ABS), Polycarbonate (PC), PC/ABS alloys.

3. The method for printing a three-dimensional part of claim 1, wherein said at least one predetermined printing material is reinforced with at least one additive selected from the group consisting of glass beads, glass fibers and carbon fibers.

4. The method for printing a three-dimensional part of claim 1, wherein said at least one build platform further comprises at least one nested shape operable to fit a respective outside profile of the part.

5. The method for printing a three-dimensional part of claim 1, wherein said at least one predetermined deposit material is selected from the group consisting of chemical agents, decorative or functional films, and functional molecules.

6. The method for printing a three-dimensional part of claim 1, wherein said at least one build platform is formed of a predetermined heat conductive material.

7. The method for printing a three-dimensional part of claim 1, wherein said part is a predetermined Class-A surface part.

8. The method for printing a three-dimensional part of claim 1, further comprising polishing said reverse side to allow for the creation of and forming said at least one predetermined three-dimensional additional feature onto said reverse side without compromising the integrity of the outer surface quality.

* * * * *

UNITED STATES PATENT AND TRADEMARK OFFICE
CERTIFICATE OF CORRECTION

Page 1 of 1

PATENT NO. : 12,330,365 B2
APPLICATION NO. : 17/273830
DATED : June 17, 2025
INVENTOR(S) : Thomas M. Whitfield et al.

It is certified that error appears in the above-identified patent and that said Letters Patent is hereby corrected as shown below:

On the Title Page

In the Abstract, Line 5:
"post processing" should read -- post-processing --; and
"three-dimension" should read -- three-dimensional --.

In the Specification

Column 1, Line 47, "imbeds" should read -- embeds --.

Column 3, Line 13, "effects" should read -- affects --;

Column 3, Line 17, "etc" should read -- etc. --; and

Column 3, Line 23, "three dimensional" should read -- three-dimensional --.

Column 4, Line 49, "effecting" should read -- affecting --; and

Column 4, Line 56, "objection" should read -- object --.

In the Claims

Column 6, Line 17, Claim 2, "is/are" should read -- is --.

Signed and Sealed this
Twenty-second Day of July, 2025

Coke Morgan Stewart
*Acting Director of the United States Patent and Trademark Office*